Sept. 11, 1951     J. W. WILSON     2,567,793

DISK SHARPENER

Filed Oct. 14, 1949

Inventor

James William Wilson

By *Clarence A. O'Brien and Harvey B. Jacobson*
Attorneys

Patented Sept. 11, 1951

2,567,793

UNITED STATES PATENT OFFICE 2,567,793

DISK SHARPENER

James William Wilson, Harrisonville, Mo.

Application October 14, 1949, Serial No. 121,353

2 Claims. (Cl. 51—170)

This invention relates generally to farm machinery and equipment, and more particularly to novel structures for supporting a disc sharpening grinder.

An object of the invention is to provide a simple and efficient grinder support so constructed that the discs of a harrow or cultivator may be sharpened without taking them apart.

Another object of the invention resides in the provision of a support for a grinder which can be used to readily adjust the height of the grinder and to pivotally support it.

Yet another object of the invention resides in the provision of novel brackets for clamping a handle and a grinder so as to provide a more unitary support.

Still other objects of the invention are to provide a disc grinder support which is strong, durable, and efficient in use, simple in construction and relatively inexpensive to manufacture.

These, together with the various ancillary objects of the invention which will become apparent as the following description proceeds, are attained by this support for a disc grinder, a preferred embodiment of which has been illustrated, by way of example only, in the accompanying drawings, wherein.

With continuing reference to the accompanying drawings, wherein like reference numerals designate similar parts throughout the various views, 10 generally designates the support or stand on which the disc driving unit is secured.

Figure 1:
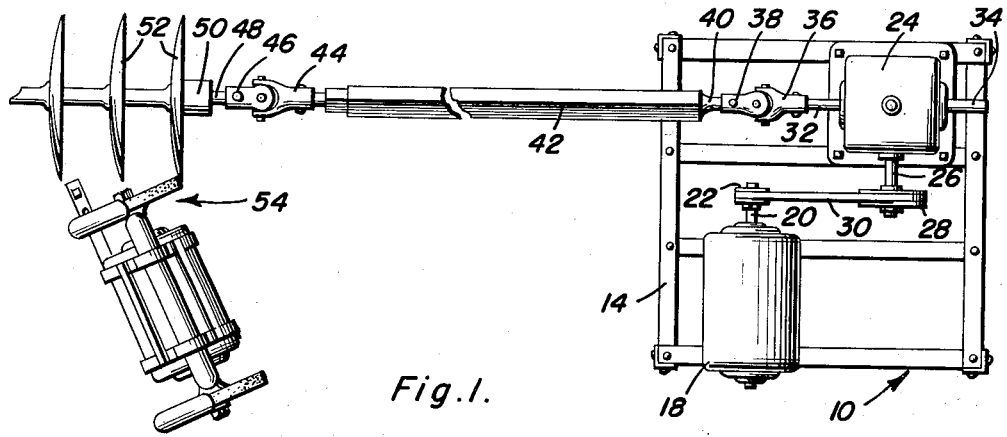
Figure 1 is a top plan view of the invention showing the disc grinder support in operative combination with a novel disc driving unit.
Figure 2:
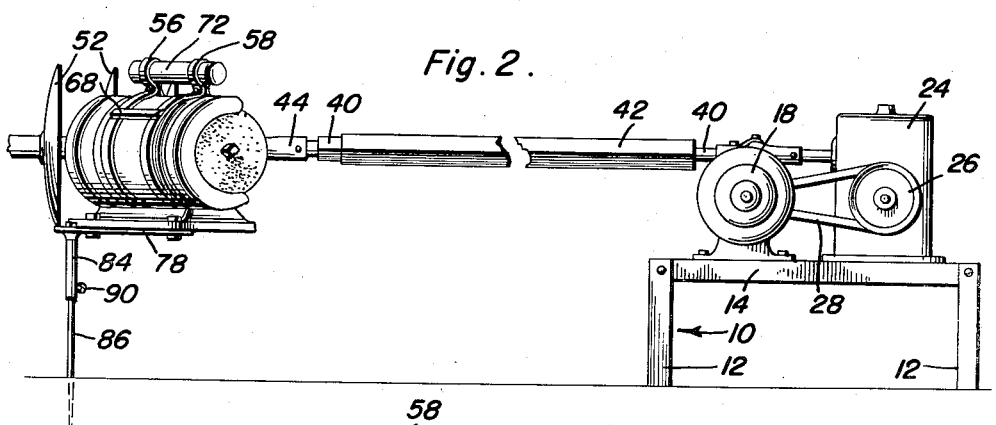
Figure 2 is a front elevational view of the combination shown in Figure 1.
Figure 3:
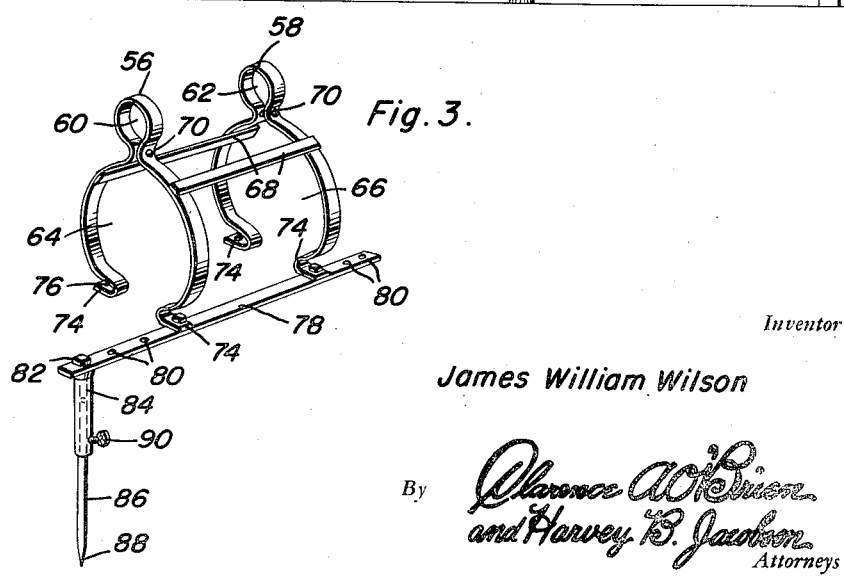
Figure 3 is a perspective view of the grinder support comprising the present invention.

A detailed description of the support 10 and the disc driving unit may be had with reference to my co-pending application, Serial No. 120,501 filed on October 10, 1949.

The support 10 comprises four angle iron legs 12 to which is welded or elsewise secured an angle iron frame 14.

An electric motor 18 is bolted or elsewise secured to the support 10. At one end of the drive shaft 20 of the electric motor is secured a pulley wheel 22. A gear reducer 24 is bolted to the frame 14 of the support 10 and has a shaft 26 with a pulley wheel 28 thereon. A V-shaped belt 30 is preferably used to connect the pulley 22 with the pulley 28. Obviously, it is of an advantage to have the pulley wheel 22 of less diameter than the pulley wheel 28 so that the speed of the shaft 26 may be somewhat reduced.

A shaft having ends 32 and 34 extending without the gear reducer 24 is driven through suitable gears in the gear reducer and at a somewhat lower rate of speed than the shaft 26. A sleeve 36 is provided which is adapted to be selectively bolted to the shaft ends 32 or 34 and together with member 38 forms a universal coupling for rotation of the connecting rod 40 which is of substantially square cross section and has a reinforcing tubular sleeve 42, also of square cross section, secured thereupon. Coupling members 44 and 46 having a universal joint therebetween are secured to the connecting rod 40 and one end of the shaft 48 respectively. Secured to the other end of the shaft is a back plate of a suitable clamp 50, the details of which are shown in the co-pending application mentioned above. Secured to the clamp 50 are the discs 52 to be sharpened.

To support the conventional grinder generally designated by reference numeral 54, a novel support bracket device is used. This novel support comprises a pair of parallel brackets 56 and 58, which substantially are similar to a figure eight, being formed with upper loops 60 and 62, and lower loops 64 and 66. Spacer bars 68 are provided to maintain the brackets 56 and 58 in their spaced relationship. Screws or bolts 70 are provided to contract the loops 60 and 62 for clamping a handle 72 therein. The bottoms of the lower edges of the brackets, as at 74, are bent outwardly and substantially horizontally, and are provided with apertures 76 for reception of bolts. While the portions 74 at one side may be bolted to the grinder frame as desired, two parallel lower portions 74 at the other side are bolted or elsewise secured to a strap 78 which has a plurality of longitudinally spaced apertures 80 therein. Within one of the apertures 80 is passed a screw or other securing device 82 which connects a tube 84 to the strap 78. Slidably inserted in the tube 84 is a pin 86 having a pointed lower end 88. Thumb screw means 90 are provided in the tube for suitably engaging the pin 86 so that the bracket may be readily adjustable with respect to height above the ground in which the pin 86 is inserted.

This support bracket is extremely flexible since the operator holds the bracket together with the grinder by means of handle 72 while the grinder is pivotal about the pin 86 which is stuck on a board or other solid object on the ground. Thusly, the discs 52 may be readily sharpened by the grinder wheels of the grinder. It is to be noted that the disks are supported so as to be clear of the ground when rotating during the grinding operation.

Since from the foregoing, the construction and advantages of this disc grinder support are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be resorted to which fall in the scope of the appended claims.

Having described the invention, what is claimed as new is:

1. A support assembly for a rotary grinder comprising a pair of spaced brackets, each of said brackets comprising a handle encompassing portion and a grinder encompassing portion adapted to be positioned about the grinder coaxially thereof, a handle secured to and between said handle encompassing portions, a base member secured to said brackets and extending therebetween substantially parallel to the axis of the grinder, said base member having a portion extending beyond one of said brackets and having a plurality of spaced apertures therein, a tube, a pin selectively inserted in said apertures and securing said tube to said base member, and a ground contacting member secured to said tube for supporting said assembly above the ground.

2. A support assembly for a rotary grinder comprising a pair of spaced brackets, each of said brackets comprising a handle encompassing portion and a grinder encompassing portion adapted to be positioned about the grinder coaxially thereof, a handle carried by said handle encompassing portions, a base member secured to said brackets and extending therebetween substantially parallel with the axis of the grinder, said base member having a portion extending beyond one of said brackets, said portion having spaced apertures therein, a vertical tube, a pin selectively insertable in said apertures and extending into said tube, whereby the tube is adjustably secured to said portion of the base member, and a pin vertically adjustably secured in said tube and depending therefrom for pivotally supporting said assembly above the ground.

JAMES WILLIAM WILSON.

REFERENCES CITED

The following references are of record in the file of this patent:

UNITED STATES PATENTS

| Number | Name | Date |
|---|---|---|
| 645,355 | Faucett | Mar. 13, 1900 |
| 900,707 | Combs et al. | Oct. 13, 1908 |
| 1,318,138 | Endres | Oct. 7, 1919 |
| 1,321,847 | Pond | Nov. 18, 1919 |
| 1,425,121 | McFeaters | Aug. 8, 1922 |
| 1,480,263 | Hoffman | Jan. 8, 1924 |
| 1,587,865 | Schneider | June 8, 1926 |
| 1,719,689 | Buehrle | July 2, 1929 |
| 1,937,664 | Oldham et al. | Dec. 5, 1933 |
| 1,994,151 | Talboys | Mar. 12, 1935 |
| 2,126,632 | Harth | Aug. 9, 1938 |
| 2,244,586 | Venable | June 3, 1941 |
| 2,487,709 | Hodges | Nov. 8, 1949 |

FOREIGN PATENTS

| Number | Country | Date |
|---|---|---|
| 498,645 | Germany | May 24, 1930 |
| 500,677 | Germany | June 24, 1930 |